(12) United States Patent
McGinnis

(10) Patent No.: US 7,249,274 B1
(45) Date of Patent: Jul. 24, 2007

(54) SYSTEM AND METHOD FOR SCALABLE CLOCK GEARING MECHANISM

(75) Inventor: Darrell S. McGinnis, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 10/748,836

(22) Filed: Dec. 30, 2003

(51) Int. Cl.
*G06F 1/12* (2006.01)

(52) U.S. Cl. ............... 713/400; 713/500; 713/503

(58) Field of Classification Search ........... 713/400, 713/500–503
See application file for complete search history.

(56) References Cited

U.S. PATENT DOCUMENTS

| | | | | |
|---|---|---|---|---|
| 5,905,766 A | * | 5/1999 | Nguyen | 375/354 |
| 5,909,563 A | * | 6/1999 | Jacobs | 710/305 |
| 6,128,749 A | * | 10/2000 | McDonnell et al. | 713/600 |
| 6,765,932 B1 | * | 7/2004 | Santahuhta | 370/503 |
| 2004/0193936 A1 | * | 9/2004 | Kelly | 713/500 |

* cited by examiner

*Primary Examiner*—Rehana Perveen
*Assistant Examiner*—Paul Yanchus
(74) *Attorney, Agent, or Firm*—Troutman Sanders LLP; James E. Schutz

(57) ABSTRACT

In some embodiments, a system and method for making a scalable clock gearing mechanism may allow multiple devices operating on different clock speeds to communicate. In an embodiment, a mechanism may be used to input data clocked on a first clock frequency and output the data on a second clock frequency. The mechanism may temporarily store the data until the next clock cycle of the second clock. Further, the mechanism may make use of multiple inputs or outputs to input or output multiple data units during a single clock cycle to keep the delay between the arrival and departure of the data small.

17 Claims, 3 Drawing Sheets

SYSTEM AND METHOD FOR SCALABLE CLOCK GEARING MECHANISM

BACKGROUND

Modern computing systems are made up of various components and subcomponents working together. As these various components and subcomponents are improved, the speed at which they are able to operate often increases. Unfortunately, components tend to be constantly at different stages of improvement in terms of optimization and speed. Accordingly, in a typical system, it may be desirable to operate different components at different speeds to take advantage of the capabilities of faster running components. To accomplish such a goal, multiple clocks may be used in a single system.

One problem associated with operating different components at different speeds concerns passing data between the components. If a fast component feeds data to a slower component, the slower component may be unable to keep up with the speed of the data input. Conversely, if a slower component feeds data to a faster component, the benefits of the faster component may not be realized.

Additionally, if a faster component continuously provides data to a slower component and the slower component attempts to read the data received, the faster component may not hold the data on the data transmission line long enough for the slower component to accurately input the data. This causes great problems and completely destroys any advantages of increasing the speeds of components capable of operating at a faster speed.

To address this problem, computer architects have developed gearing mechanisms to allow a fast component, such as a processor, to interface with a slower component, such as a memory device. The problem with existing gearing mechanisms is that they are custom designed for a particular system. It is desirable for a computing system to be upgradeable to take advantage of ever improving components without necessitating the acquisition of an entirely new system.

DETAILED DESCRIPTION OF THE EMBODIMENTS

The present invention may typically be embodied in a system and method for interfacing components utilizing different clock speeds. Although an embodiment of the present invention may be described in terms of interfacing to memory components, those skilled in the art will appreciate that the adjustable gearing mechanism described may be applied to the interface of any two devices using different clock speeds. An embodiment of the present invention may typically be employed within a memory controller hub (MCH) of a chipset architecture.

Figure 1:
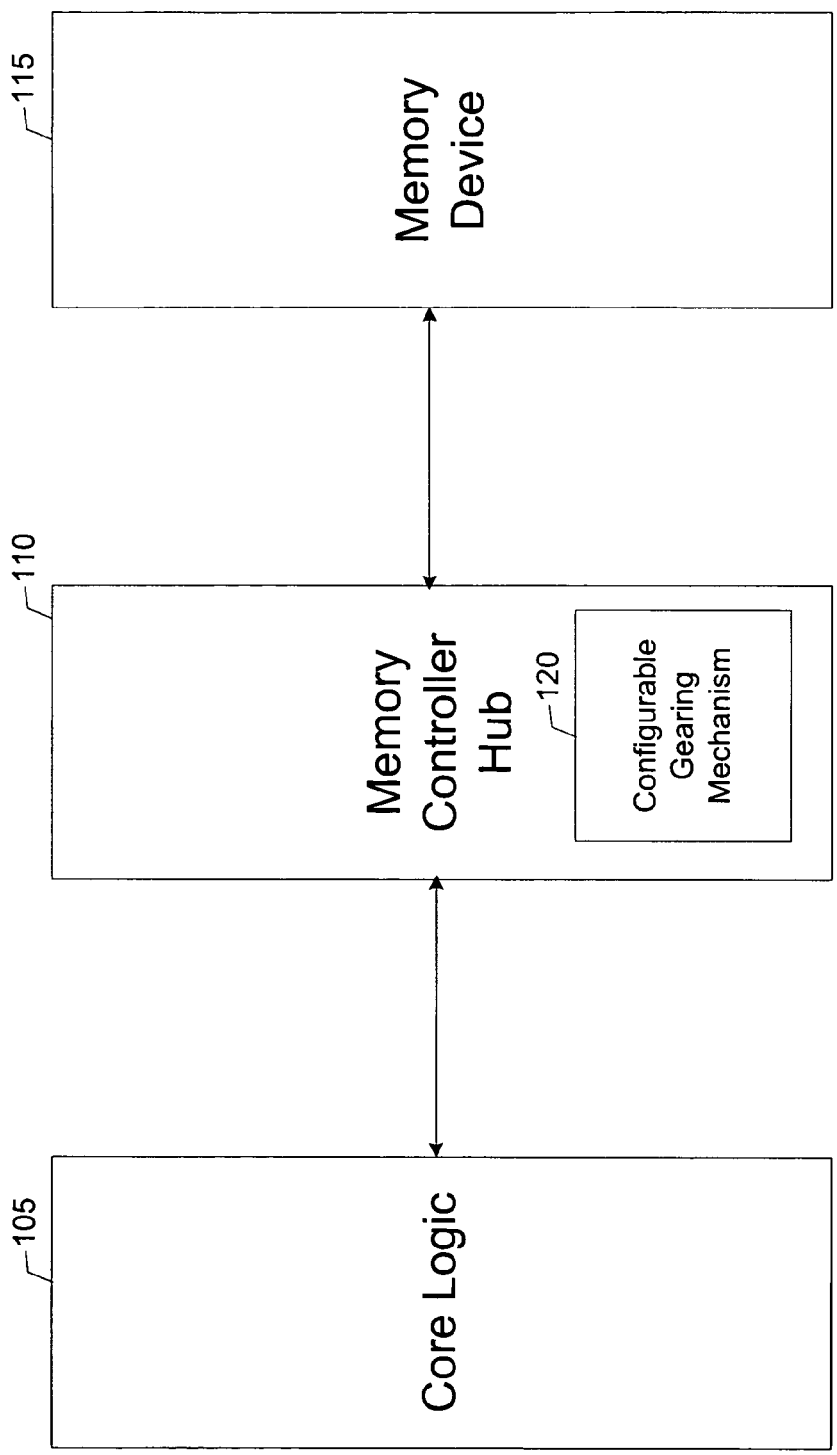
FIG. 1 is a block diagram illustrating an exemplary embodiment of the present invention.

FIG. 1 is a block diagram of an exemplary operating environment of the present invention. FIG. 1 illustrates a core logic unit 105, a memory controller hub 110, and a memory device 115. The core logic unit 105 may typically include a processor and any other hardware associated with processing data and calculations. The memory device 115 may be any device capable of storing data. In an exemplary embodiment of the present invention, double data rate (DDR) memory may be used as the memory device 115.

The memory controller hub 110 may control the memory device 115 and coordinate communications between the memory device 115 and other components of the system. In accordance with an embodiment of the present invention, the memory controller hub 110 may include a configurable gearing mechanism (CGM) 120. The CGM may be responsible for coordinating data received at one speed with the memory device 115 operating at another speed. In alternative embodiments of the present invention, the CGM may be used to coordinate data to other system components and is not limited to memory devices 115. Throughout the present description, the terms gear and gearing may be used to describe the process of translating one clock speed, or domain, to another clock speed, or domain.

The CGM may be operative to gear one clock domain to another clock domain and to support a varied set of clock ratios. The clock ratio may represent the relationship between the clock speeds being translated. Generally, a source clock (such as a system clock) and a destination clock (in this embodiment the memory clock) may have a known and fixed relationship. In such an embodiment, the two clocks generate a repeating beat period of known and consistent edge relationships between the two clock domains. For example, if a 200/800 MHz system bus is used with a DDR333 memory device, the system bus clock has 6 clock cycles in the same time period in which the memory clock has 5 cycles. Thus, in this example, the system clock and the memory clock have a 6:5 ratio. This ratio may be referred to as the gearing ratio throughout this description.

In an embodiment of the present invention, as shown in FIG. 1, a core logic unit 105 may pass data to a memory device 115. In such an embodiment, the logic unit 105 may operate on a faster clock than the memory device 115. The memory controller hub 110 may coordinate the exchange of data between the two devices (105, 115) and utilize a configurable gearing mechanism 120 to handle the clocking differences. The configurable gearing mechanism 120 may be operable to receive data at one clock speed and output the data at a second clock speed.

Figure 2:
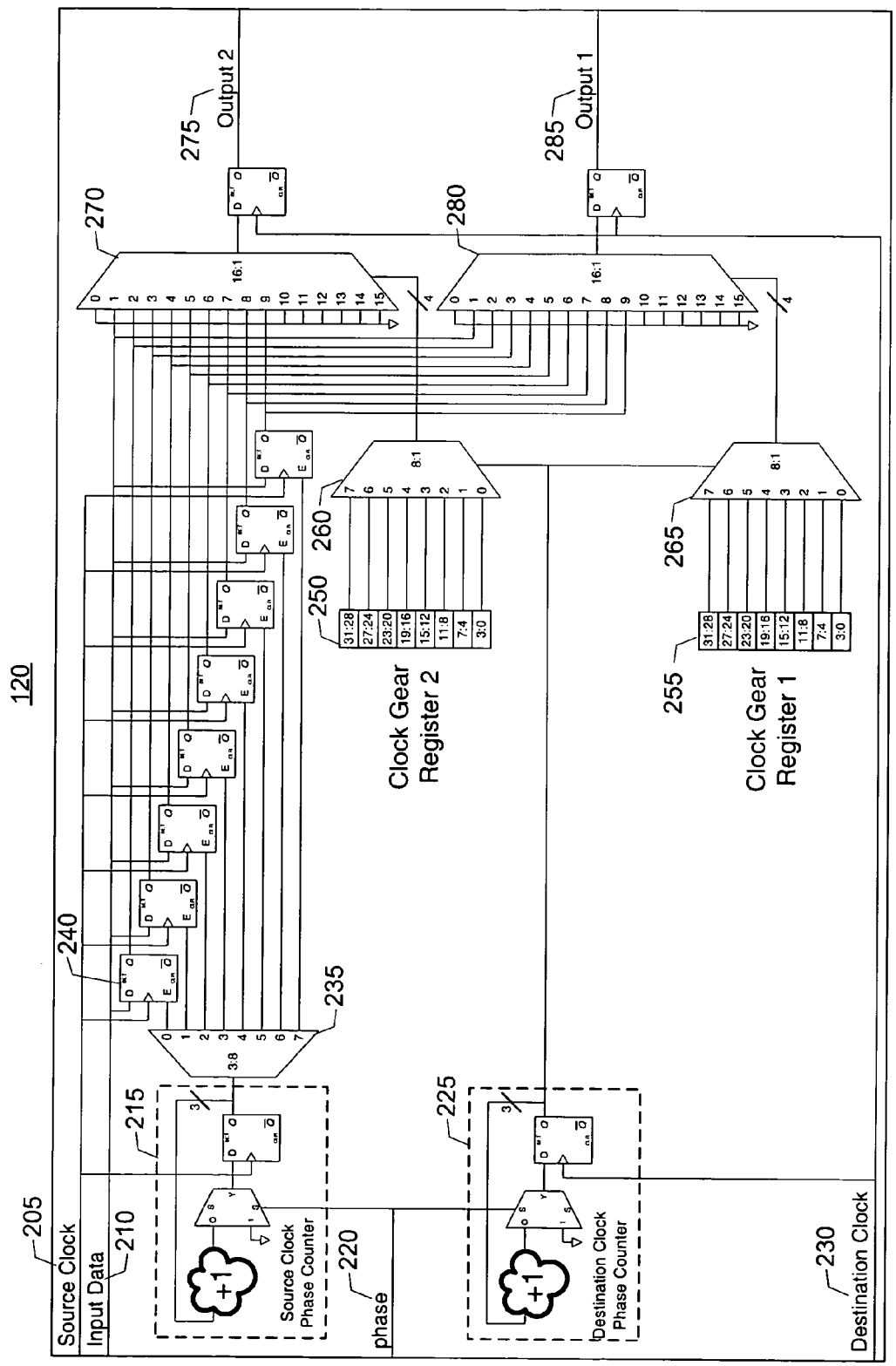
FIG. 2 is a block diagram illustrating an exemplary embodiment of the present invention.

FIG. 2 is a block diagram illustrating an exemplary embodiment of the present invention. FIG. 2 shows a circuit by which input data 210 clocked by a source clock may be converted to output data 1 and output data 2 clocked by a destination clock. In this example, the source clock 205 may be operating at a faster rate than the destination clock 230. As is shown, one input signal 210 may be converted into two output signals 275, 285. By providing two outputs 275, 285, the source clock 205 may operate at up to twice the speed of the destination clock 230 without losing any data. Thus, when two outputs are provided, the gearing mechanism 120 may support a source clock 205 that is up to twice as fast as the destination clock 230. In other words, one input signal at a given frequency may be converted to two output signals at half the frequency. If three outputs were provided, the maximum supported source speed may be three times the destination speed. Those skilled in the art will recognize that any speed differential may be supported provided a sufficient number of output lines are available. Further, if more input data lines are used than output data lines, the gearing mechanism may operate in reverse thereby allowing the destination clock 230 to operate at a faster rate than the source clock 205.

As shown in FIG. 2, inputs to the configurable gearing mechanism 120 may include, but are not limited to, a source clock 205, input data 210, destination clock 230, and a phase signal 220. The source clock 205 may be a clock signal that clocks the input data 210. In alternative embodiments of the present invention, the source clock 205 may clock multiple input data signals. The destination clock 230 may be the clock signal for the device to which the output data may be directed. In an exemplary embodiment of the present invention, the destination device is a memory device and the destination clock is a memory clock. Alternatively, the destination device may be any clocked device.

Figure 3:
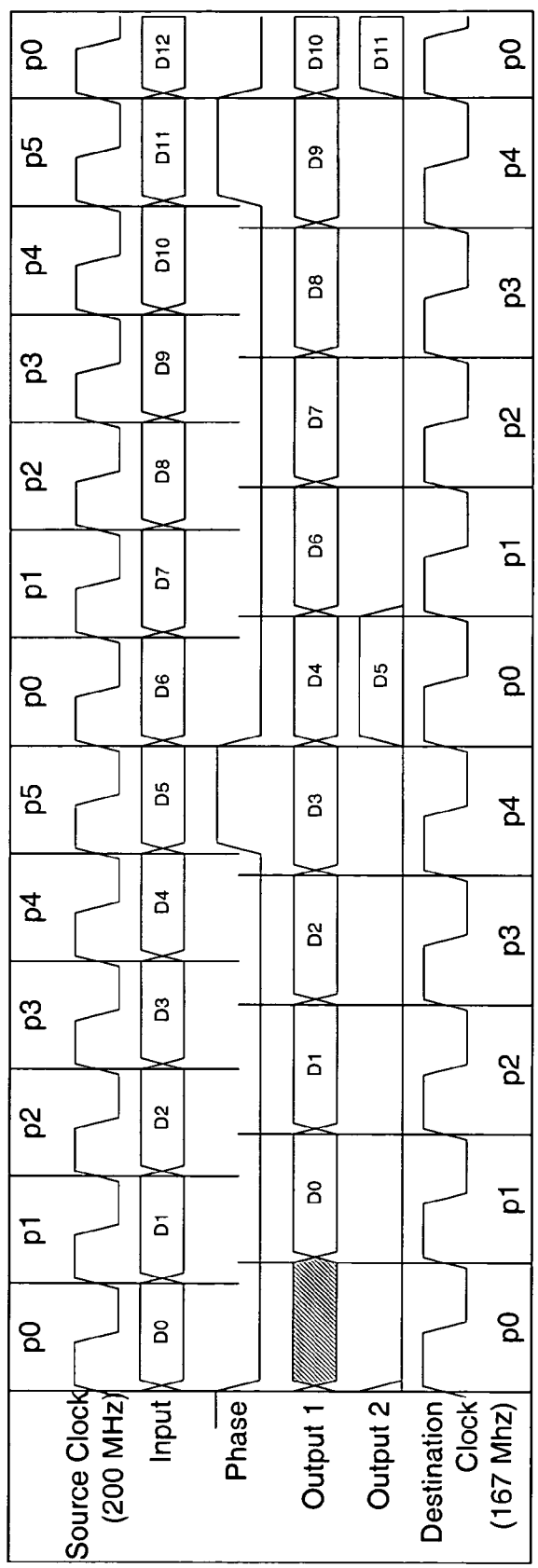
FIG. 3 is a timing diagram illustrating the timing of a gearing mechanism in accordance with an exemplary embodiment of the present invention.

The phase signal 220 may be a configurable signal that resets the counters when the end of a phase cycle is reached. The phase signal will be described with reference to FIG. 3. FIG. 3 is a timing diagram illustrating the timing of a gearing mechanism in accordance with an exemplary embodiment of the present invention. The timing diagram of FIG. 3 shows the timing of an exemplary embodiment of the present invention in which a 200 MHz source clock 205 and a 167 MHz destination clock 230 are used. As shown in FIG. 3, in one embodiment the source clock 205 completes six cycles in the same time period as the destination clock 230 completes five cycles. Accordingly, in this embodiment, the gearing ratio required to coordinate data between the source clock 205 domain and the destination clock 230 domain is 6:5. Those skilled in the art will recognize that the example illustrated in FIG. 3 is merely one example of the invention and numerous other timing combinations may be available. The phase signal 220 may indicate when the end of a phase occurs. As shown in FIG. 3, in an exemplary embodiment of the present invention, the falling edge of the phase signal 220 may indicate the beginning of a new phase period which occurs at the moment that both the source clock 205 and the destination clock 230 rising edges coincide. Thus, in the present example, every phase period includes six source clock cycles and five destination clock cycles. Further, in an embodiment, the source clock 205 and the destination clock 230 may be synchronized so that, once a period, the clock edges are aligned. However, those skilled in the art will recognize that exemplary embodiments of the system may still function correctly if the clock edges are not aligned provided that the correct number of clock cycles of each clock occur during each phase.

In an exemplary embodiment of the present invention, the phase signal 220 may be timed based on the faster clock signal (in the present example, the source clock 205). As shown in FIG. 3, the phase signal 220 may be high for one clock cycle prior to the beginning of a new phase period. Timing the phase signal 220 based on the faster clock may assure that the phase signal 230 is high during only one clock cycle of both clocks. If the phase signal 220 were timed based on the slower clock, the phase signal 220 may be high for more than one clock cycle of the faster clock, and timing the beginning of a new phase cycle may be more complicated. Accordingly, the phase signal 220 may be operated using a counter that counts the clock cycles of the source clock 205 and goes high for one clock cycle before the counter resets to count the next phase.

In an exemplary embodiment of the present invention, output 1 285 may carry an output signal every clock cycle and output 2 275 may carry an output signal when two outputs are available. Typically, the output 2 275 may carry an output signal as often as may be necessary to keep the output data to the destination device from falling any further behind the source input than required. Alternatively, the output 2 275 signal line may be used whenever the system desires to output a second output. In the example shown in FIG. 3, output 1 285 may carry an output signal every clock cycle and output 2 275 may carry an output signal once a period. Those skilled in the art will recognize that the output signals 275, 285 are used to output the input data as soon as possible using the destination clock 230. Since, in the current example, the source clock 205 may be faster than the destination clock 230, the output data may be transmitted on the output signal lines 275, 285 in the next full destination clock 230 cycle after the input signal is received. In FIG. 3, each phase cycle may be broken up into phase units referenced by number p0 through p5 for the source clock 205 and p0 through p4 for the destination clock 230, where p0 may represent the first unit of each phase cycle. Starting at p0 on the left side of FIG. 3, input data D0 may be received during phase unit p0 on the input data line 210. This data may then be outputted on the output 1 line 285 in the next available destination clock cycle, p1. This may continue for each clock cycle. When input data D5 is received, the gearing mechanism may still not have outputted D4. Thus, in the next destination clock cycle, the mechanism may output D4 on output 1 285 and D5 on output 2 275. This may catch the output data up with the input data and allow the mechanism 120 to start over the transmission process for the next period.

In an exemplary embodiment of the present invention, the output 2 275 signal line may be used as often as necessary to minimize the delay between the receipt of an input data unit and the output of that data. Accordingly, whenever more than one input data unit is available at the beginning of a destination clock 230 cycle, both outputs 1 and 2 275, 285 may be utilized. This procedure may be expanded to cover any number of inputs and outputs. For example, and not limitation, when multiple input data units are available for output, an appropriate number of output signal lines 275, 285 may be used in the following destination clock cycle to advance each available input to the destination device.

In the present example, two outputs may be available and the gearing mechanism 120 may support a source clock 205 that operates at twice the speed of the destination clock 230, a 2:1 ratio. In another case, both output lines 275, 285 may be used every destination clock cycle to transmit the two input signals that arrived during the previous destination cycle.

Referring back to FIG. 2, in which an exemplary single input, dual output embodiment of the present invention is illustrated, the configurable gearing mechanism 120 will be described in greater detail. FIG. 2 illustrates a source clock phase counter 215 and a destination clock phase counter 225. The source clock phase counter 215 may be clocked by the source clock 205 and may count the number of source clock cycles in the current phase. The counter may be reset by the phase 220 input each time a new phase cycle begins. The source clock phase counter 215 may identify which phase unit (p0, p1, . . . , pX) the source clock 205 is in. The phase units are discussed separately with reference to FIG. 3. In the example illustrated in FIG. 3, the source clock phase counter 215 may count from p0 to p5 and then may be reset by the phase input 220. The destination clock phase counter 225 may be clocked by the destination clock 230 and may counts the number of destination clock cycles in the current phase. The counter may be reset by the phase 220 input each time a new phase cycle begins. The destination clock phase counter 225 may identify which phase unit (p0, p1, . . . , pX) the destination clock 230 is in. In the example illustrated in FIG. 3, the destination clock phase counter 225 may count from p0 to p4 and then may be reset by the phase input 220.

The input data 210 may be connected to a series of latches 240. Each latch 240 may correspond to a different phase of the source clock 205. The latches 240 may each be clocked by the source clock 205 and may be enabled by a phase selector 235. The phase selector 235 may be implemented by a demultiplexor. The phase selector 235 may be controlled by the source clock phase counter 215 and may direct input data to the correct output on the output 2 selector 270. The output 2 selector 270 may select the correct data to be output on the output 2 signal 275. An output 1 selector 280 may also be provided to select the correct data to be outputted on the output 1 signal 285.

The output 1 selector 280 and the output 2 selector 270 may be controlled by clock gear register 1 255 and clock gear register 2 250. In an exemplary embodiment of the present invention, multiplexors 260, 265 may be controlled by the destination clock phase counter 225 and may direct the correct nibble (4 bits) of data from the clock gear registers to the output selectors 270, 280.

Those skilled in the art will recognize that the exemplary embodiment of the present invention illustrated in FIG. 2 may use one input and two outputs and may allow up to eight phases for the source clock 205 and destination clock 230. Further, those skilled in the art will recognize that the present invention may be easily scalable to allow any desired number of inputs, outputs, and phases. For example, and not limitation, if a maximum of sixteen source clock phases were desired, the source clock phase counter 215 may be implemented with a four-bit counter (counts 0 to 15) and the phase selector 235 may be implemented with a demultiplexor with sixteen outputs.

The clock gear registers 250, 255 may allow the configurable gearing mechanism 120 to be customized for particular clock speeds. These registers 250, 255 may be used to select which latch 240 data is directed to a particular output 275 or 285. Clock gear register 1 255 may identify which data should be outputted on output 1 285 for each destination clock phase. Clock gear register 2 250 may identify which data should be outputted on output 2 275 for each destination clock phase. Typically, these registers may be programmable to select the phase determinations based on the desired clock speeds of the source clock 205 and the destination clock 230.

In an exemplary embodiment of the present invention, the clock gear registers may direct the data by selecting which input of the output selectors 270, 280 is activated. For example, and not limitation, the clock gear register 1 255 may be programmed as follows to produce the outputs shown in FIG. 3:

| Phase | Output Selector |
|---|---|
| p0 | 6 (corresponds to the fifth data latch) |
| p1 | 2 (corresponds to the first data latch) |
| p2 | 3 (corresponds to the second data latch) |
| p3 | 4 (corresponds to the third data latch) |
| p4 | 5 (corresponds to the fourth data latch) |
| p5 | 0 (disable, only 5 destination phases in example) |
| p6 | 0 (disable, only 5 destination phases in example) |
| p7 | 0 (disable, only 5 destination phases in example) |

Further, the clock gear register 2 250 may be programmed as follows to produce the outputs shown in FIG. 3:

| Phase | Output Selector |
|---|---|
| p0 | 7 (corresponds to the sixth data latch) |
| p1 | 0 (disable) |
| p2 | 0 (disable) |
| p3 | 0 (disable) |
| p4 | 0 (disable) |
| p5 | 0 (disable) |
| p6 | 0 (disable) |
| p7 | 0 (disable) |

Those skilled in the art will recognize that the clock registers 255, 250 may be programmed to send any particular data latch 240 to the desired output during the desired phase. In an alternative embodiment of the present invention, the configurable gearing mechanism 120 may be pre-programmed for each possible gearing ratio and utilize the correct register data for that ratio.

The description of the various embodiments are not intended to limit the scope of the invention in any way and other alternative embodiments may be practiced without departing from its spirit and scope. Accordingly, the scope of the present invention may be defined by the appended claims rather than the foregoing description.

I claim:

1. A method, comprising:
   identifying a source clock frequency having a source clock period;
   identifying a destination clock frequency having a destination clock period;
   identifying a clock gearing ratio corresponding to the source and destination clock frequencies;
   receiving a source data stream at the source clock frequency, wherein the data stream is comprised of a plurality of source data units;
   providing the source data stream as a destination data stream at the destination clock frequency; and
   providing the destination data stream on a plurality of data outputs such that each received source data unit is provided as a destination data unit in the next destination clock period.

2. The method of claim 1, wherein the step of identifying a clock gearing ratio further comprises:
   selecting a gearing ratio from a predetermined set of gearing ratios.

3. The method of claim 1, wherein the step of providing the source data stream as a destination data stream at the destination clock frequency further comprising:
   delaying a source data unit; and
   outputting the source data unit as a destination data unit during a clock cycle associated with the destination clock frequency.

4. The method of claim 1, wherein the gearing ratio represents a first number of source clock periods that occur in substantially the same time period as a second number of destination clock periods.

5. The method of claim 1, further comprising:
   providing data representative of the clock period in which a data unit is output.

6. The method of claim 1, further comprising:
   outputting a first received source data unit as a first destination data unit in the next available destination clock period.

7. A method comprising:
identifying a source clock frequency having a source clock period;
identifying a destination clock frequency having a destination clock period;
identifying a clock gearing ratio corresponding to the source and destination clock frequencies;
receiving a source data stream at the source clock frequency, wherein the data stream is comprised of a plurality of source data units;
providing the source data stream as a destination data stream at the destination clock frequency; and
outputting a first received source data unit and a second received source data unit as a first destination data unit and a second destination data unit in the next available destination clock period on a first destination output and a second destination output.

8. The method of claim 1, further comprising:
receiving a first source data unit on a first source input and a second source data unit on a second source input;
providing the first source data unit as a first destination data unit in the next available destination clock period on a first destination output;
providing the second source data unit as a second destination data unit in a successive destination clock period on the first destination output.

9. A system, comprising:
a first data input for receiving input data clocked by a source clock;
a first output selector adapted to direct selected received input data to a first output as first output data;
a second output selector adapted to direct selected received input data to a second output as second output data;
a first clock gear register adapted to control the first output selector;
a second clock gear register adapted to control the second output selector;
wherein the first and second clock gear registers provide data representative of the destination clock periods in which data is output to the first and second outputs.

10. The system of claim 9, wherein the clock gear registers are programmable to provide customized gearing changes without system modification.

11. The system of claim 9, further comprising:
a destination clock phase counter in communication with the clock gear registers and adapted to monitor the destination clock phase and to communicate the clock phase to the clock gear registers.

12. The system of claim 11, wherein the destination clock phase counter resets based on the status of a phase signal.

13. The system of claim 11, further comprising:
a source clock phase counter adapted to monitor the source clock phase and to direct input data to the output selectors.

14. The system of claim 13, further comprising:
a phase selector in communication with the source clock phase counter for identifying the source clock phase and associating input data received during a source clock phase with the source clock phase.

15. The system of claim 13, wherein the source clock phase counter resets based on the state of a phase signal.

16. The system of claim 9, further comprising a core logic unit.

17. The system of claim 9, further comprising a memory device.

* * * * *